(12) United States Patent
Speight

(10) Patent No.: US 7,431,870 B2
(45) Date of Patent: Oct. 7, 2008

(54) AUTOMATED MOLDING TECHNOLOGY FOR THERMOPLASTIC INJECTION MOLDING

(75) Inventor: Russell Gordon Speight, Victoria (AU)

(73) Assignee: Moldflow Pty. Ltd, Victoria (AU)

( * ) Notice: Subject to any disclaimer, the term of this patent is extended or adjusted under 35 U.S.C. 154(b) by 188 days.

(21) Appl. No.: 11/379,117

(22) Filed: Apr. 18, 2006

(65) Prior Publication Data

US 2006/0197247 A1  Sep. 7, 2006

Related U.S. Application Data

(62) Division of application No. 09/601,955, filed as application No. PCT/AU99/00067 on Jan. 29, 1999, now Pat. No. 7,037,452.

(30) Foreign Application Priority Data

Feb. 12, 1998 (AU) .................................... PP1768

(51) Int. Cl.
*B29C 45/77* (2006.01)
(52) U.S. Cl. .................. 264/40.1; 425/145; 425/156
(58) Field of Classification Search ................ 264/40.1; 425/145, 155, 156, 159
See application file for complete search history.

(56) References Cited

U.S. PATENT DOCUMENTS

| 3,767,339 A | 10/1973 | Hunkar |
| 3,860,801 A | 1/1975 | Hunkar |
| 3,889,849 A | 6/1975 | Chandler, Jr. |
| 3,941,534 A | 3/1976 | Hunkar |
| 4,311,446 A | 1/1982 | Hold et al. |
| 5,062,784 A | 11/1991 | Inaba et al. |
| 5,470,218 A | 11/1995 | Hillman et al. |
| 5,500,166 A | 3/1996 | Sasaki et al. |
| 5,518,671 A | 5/1996 | Takizawa et al. |
| 5,639,487 A | 6/1997 | Wurst et al. |
| 5,898,591 A | 4/1999 | Hettinga et al. |
| 5,900,259 A | 5/1999 | Miyoshi et al. |

FOREIGN PATENT DOCUMENTS

EP  0233548  2/1987

OTHER PUBLICATIONS

Rosato et al., "Injection Molding Handbook", Second Edition, Chapter 7, 1995, pp. 512-580, and Chapter 11, pp. 813-862.
Canadian Examination Report issued Mar. 27, 2006.

*Primary Examiner*—Jill L Heitbrink
(74) *Attorney, Agent, or Firm*—Buchanan Ingersoll & Rooney PC

(57) ABSTRACT

A method for the automated setting-up of an injection molding machine, the machine for manufacturing injection molded parts and including an injection screw and a configurable injection velocity, including the steps of: manufacturing one of more parts with the machine; determining an injection pressure profile by measuring injection pressure as a function of elapsed injection time with the machine configured with a substantially constant, desired injection velocity; measuring injection velocity as a function of elapsed injection time and determining a profile of the measured injection velocity; defining a mean pressure profile from the pressure profile in a regime of substantially constant measured injection velocity profile; adjusting the velocity profile over at least a portion of an injection velocity phase in response to the pressure profile to reduce differences between the pressure profile and the mean pressure profile, thereby tending to lessen irregularities in the pressure profile.

14 Claims, 3 Drawing Sheets

AUTOMATED MOLDING TECHNOLOGY FOR THERMOPLASTIC INJECTION MOLDING

RELATED APPLICATIONS

This application is divided from application Ser. No. 09/601,955, which is the national stage of international application Ser. No. PCT/AU99/00067 claiming priority from Australian application Ser. No. PP1768 filed 12 Feb. 1998 whose content is incorporated herein by reference in its entirety.

FIELD OF THE INVENTION

The present invention relates to thermoplastic injection molding and in particular to the automation of the die setter's role in the setting of parameters of injection molding machines. The invention may also be applicable to reactive injection molding.

BACKGROUND OF THE INVENTION

Injection molding is one of the most important and efficient manufacturing techniques for polymeric materials, with the capability to mass produce high value added products, such as the compact disc. Injection molding can be used for molding other materials, such as thermoset plastics, ceramics and metal powders. The process in its present form was developed in the mid 1950s, when the first reciprocating screw machines became available. Material, machine and process variations are important in this complex multi-variable process. There are three interacting domains for research and development: 1) polymeric material technology: introduction of new and improved materials; 2) machine technology: development of machine capability; and 3) processing technology: analysis of the complex interactions of machine and process parameters. As improved product quality and enhanced engineering properties are required of polymeric materials, the injection molding process has become increasingly complex: as service properties increase material processability tends to decrease.

Thermoplastics can be classified as bulk or engineering materials. Engineering materials are typically more difficult to process, and more expensive, and therefore their processing would benefit the most from automated molding optimization (AMO). Injection molding is a batch operation, so machine set-up ultimately affects productivity.

Any molding operation should aim to manufacture component products to a specific quality level, in the shortest time, in a repeatable and fully automatic cycle. Injection molding machines usually provide velocity control and pressure control, that is, control of the velocity of the injection screw when filling the part and control of the pressure exerted by injection screw when packing/holding the part, respectively. The following description assumes the use of a modern injection molding machine, after circa 1980, with velocity control of the mold filling and pressure control of the packing/holding stages.

The typical injection molding cycle is as follows:

1) Plasticisation Stage: plasticisation occurs as the screw rotates, pressure develops against the 'closed-off' nozzle and the screw moves backwards ('reciprocates') to accumulate a fresh shot (the molten polymer in front of the screw), ready for injection of melt in front of the screw tip. Back pressure determines the amount of work done on the polymer melt during plasticisation. Polymer melt is forced through the screw non-return valve. Material is fed to the screw by gravity from a hopper. The polymeric material may require conditioning, especially in the case of engineering thermoplastics, to ensure melt homogeneity and therefore that the melt has consistent flow characteristics.

2) Injection/Filling Stage: the empty mold is closed, and a 'shot' of polymer melt is ready in the injection unit, in front of the screw. Injection/filling occurs, polymer melt is forced though the nozzle, runner, gate and into the mold cavity. The screw non-return valve closes and prevents back-flow of polymer melt. In this, the mold filling part of the injection molding cycle, high pressures of the order of 100 MPa are often required to achieve the required injection velocity.

3) Packing/Compression Stage: a packing pressure occurs at a specified VP or 'switch-over' point. This is the velocity control to pressure control transfer point, i.e. the point at which the injection molding machine switches from velocity control to pressure control. 'Switch-over' should preferably occur when the mold cavity is approximately full, to promote efficient packing. The switch-over from injection to packing is typically initiated by screw position. Switch-over can be initiated by pressure, i.e. hydraulic, nozzle melt injection pressures or cavity melt pressure parameters measured from the machine. The end of this stage is referred to as 'pack time' or 'packing time'.

4) Holding Stage: a second stage pressure occurs after the initial packing pressure and is necessary during the early stages of the cooling of the molded part to counteract polymer contraction. It is required until the mold gate freezes; the injection pressure can then be released. This phase compensates for material shrinkage, by forcing more material into the mold. Typical industrial machine settings use one secondary pressure, combining the packing and holding phases, to allow for easier machine set-up. It has been shown that under packing results in premature shrinkage, which may lead to dimensional variation and sink marks. Over packing may cause premature opening of the tool (i.e. the die or mold of the component(s) to be manufactured) in a phenomenon known as flashing, difficulties in part removal (sticking) and excessive residual stresses resulting in warpage. Analysis of the packing phase is therefore an essential step in predicting the final product quality. The portion of filling after switch-over can be more important than the velocity controlled primary injection stage. The end of this stage is known as 'hold time' or 'holding time'.

5) Cooling Stage: This phase starts as soon as the polymer melt is injected into the cavity. The polymer melt begins to solidify when in contact with the cavity surface. Estimating cooling time is becoming increasingly important, especially when large numbers of components are being molded. In order to calculate cooling time, component ejection temperature should be known. Cooling an injection molded product uniformly may mean cooling the mold at different rates, in different areas. The aim is to cool the product as quickly as possible, while ensuring that faults such as poor surface appearance and changes in physical properties are not encountered. The aims for a cooling system are: (i) minimum cooling time, (ii) even cooling on part surfaces, and (iii) balanced cooling between a core and a cavity part of a two-plate tool system. Tool temperature control is required to maintain a temperature differential $\Delta T$ between the tool and the polymer melt. For example, a typical polyoxymethylene melt temperature is 215° C., tool temperature is 70° C., and hence ΔT=145° C. Adverse effects to product quality must be expected for no or poor temperature control. The cooling phase enables the polymer melt to solidify in the impression, owing to the heat transfer from the molded product to the tool. The tool temperature influences the rate at which heat is transferred from the polymer melt to the tool. The differences in heat transfer rate influence polymer melt shrinkage, which in turn influences product density. This effect influences product weight, dimensions, micro-structure and surface finish. The tool cavity surface temperature is critical to the processing and quality of injection molded components. Each part of the product should be cooled at the same rate, which often means that non-uniform cooling must be applied to the tool. Thus, for example, cool water should be fed into the inner parts of the tool cooling system (particularly in the area of the gate) and warmer water should be fed into the outer parts. This technique is essential when molding flat components to close tolerances, or large components that include long melt flow lengths from the gating position. Tool design must thus preferably incorporate adequate temperature control zones (flow ways), to provide the desired tool temperature. Tool temperature control zones commonly use water for temperatures up to 100° C., above which oil or electrical heating is used.

Injection molding is one of the most sophisticated polymer processing operations, with machine costs typically ranging from US$50,000 to well over US$1,000,000 and tool costs ranging from $10,000 to well over $100,000. The vital operation of tool set-up is often not given the attention it deserves. If a machine is poorly set-up, then this will affect the cost of production, through cycle time and part rejection rates. Machine set-up is still regarded as a black art, reliant on the experience of a manual die setter (i.e. the person responsible for setting parameters on the injection molding machine to achieve acceptable quality production). In a typical injection molding manufacturing facility machine set-up is often overlooked with the requirement to 'get parts out the door'. In this rush machine set-up is often done with inconsistent strategies as different die setters have their own personal views as to what constitutes an optimal set-up. Manufacturing facilities typically have a high staff turn-over on the shop floor, and so training and maintaining an adequate level of experience is also a high cost.

SUMMARY OF THE INVENTION

An object of the present invention is to provide substantially automated optimization of at least a part of the injection molding set-up process. It is a further object of the present invention to provide more consistent machine set-up in an automated manner throughout a manufacturing facility.

The present invention provides a method for the automated setting-up of an injection molding machine, said machine for manufacturing injection molded parts and including an injection screw and a configurable injection velocity, comprising the steps of:

(1) manufacturing one of more parts with the machine;

(2) determining an injection pressure profile by measuring injection pressure as a function of elapsed injection time with the machine configured with a substantially constant, desired injection velocity;

(3) measuring injection velocity as a function of elapsed injection time and determining a profile of the measured injection velocity;

(4) defining a mean pressure profile from the pressure profile in a regime of substantially constant measured injection velocity profile;

(5) adjusting the velocity profile over at least a portion of an injection velocity phase in response to the pressure profile to reduce differences between the pressure profile and the mean pressure profile, thereby tending to lessen irregularities in the pressure profile.

In a particular embodiment, step (5) is performed only in the regime.

Steps (1) and (2) may be repeated a plurality of times to obtain a plurality of measurements of injection pressure profile and the injection pressure profile is determined from a mean of the measurements.

In one embodiment, steps (1) to (5) are repeated a plurality of times, thereby progressively refining the velocity profile.

Thus, the velocity profile can be progressively adjusted to reduce or eliminate irregularities in the pressure profile. The step of adjusting the velocity profile may be repeated to further reduce such irregularities, to whatever tolerance is required.

Step (5) may comprise increasing the injection velocity where the pressure profile is less than the mean pressure profile, and decreasing the injection velocity where the pressure profile is greater than the mean pressure profile.

In one embodiment, the mean pressure profile is linear.

Preferably the pressure profile is in the form of a derivative pressure profile, obtained by differentiating the pressure profile with respect to time.

Thus, the method is preferably performed with the time derivative of the pressure, rather than the pressure itself.

The method may include determining a relationship between the injection velocity and the pressure profile by perturbing the injection velocity about a predetermined velocity.

The relationship may includes compensation for melt viscosity changes. In one embodiment, the viscosity changes include viscosity changes owing to melt pressure and temperature changes.

Thus, the response of the pressure profile to changes to the injection velocity can be determined by performing test injections over a narrow range of injection velocities.

The perturbation of the injection velocity may be by predetermined amounts, and more preferably the perturbation of the injection velocity is by ±10% and/or ±20%.

The pressure profile may be derived from hydraulic injection pressure or from melt flow pressure.

The method may include determining a viscosity model by performing a material test of the injection melt material.

Thus, for non-Newtonian plastics (in reality all plastics) the prediction of the response of the pressure profile to changes in the velocity profile can be improved if the viscosity is first measured.

The present invention further provides a method for the automated setting-up of an injection molding machine, the machine for manufacturing injection molded parts and including an injection screw and a configurable injection velocity, the screw having a displacement, including the steps of:

(1) manufacturing one or more parts with the machine;

(2) defining as a first pressure the end of velocity control phase pressure and as a second pressure the holding time pressure;

(3) defining a linear relationship between packing/holding pressure and time consistent with the first pressure and the second pressure, between the first pressure and the second pressure;

(4) defining the packing time as a time of maximum difference between measured melt pressure and the linear relationship, or as the switchover point if measured melt pressure increases after the switchover point;

(5) determining a first screw displacement being the minimum displacement of the screw before the packing time within a packing/holding phase and a second screw displacement being the displacement of the screw at the packing time; and (6) calculating the kickback from the difference between the first and second screw displacements, thereby allowing a determination of the kickback from measurements of the screw displacement at packing time.

Thus, maximum kickback-or the negative or backward movement of the screw at the velocity to pressure transfer point-may be determined from the screw displacement at packing time.

The present invention still further provides a method for the automated setting-up of an injection molding machine, the machine including an injection screw, including the steps of:

(1) setting an initial packing/holding pressure to a default low pressure;

(2) performing at least a partial injection cycle;

(3) determining kickback from changes in screw displacement during the at least partial injection cycle;

(4) incrementing the initial packing/holding pressure; and (5) repeating steps (3) and (4) if kickback is unacceptably high until kickback is reduced to a predetermined acceptable level, or initial packing/holding pressure reaches maximum machine pressure.

In one embodiment, the initial packing/holding pressure is between 5% and 25% of end of velocity control phase pressure, and a substantially uniform packing pressure is used, and more preferably the initial packing/holding pressure is approximately 10% of end of velocity control phase pressure.

The initial packing/holding pressure may be incremented by between 2% and 25% of the end of velocity control phase pressure, and more preferably the initial packing/holding pressure is incremented by approximately 5% of the end of velocity control phase pressure.

In one particular embodiment, the method includes measuring kickback for a plurality of initial packing/holding pressures, predicting an optimum initial packing/holding pressure from the measurements to minimize kickback, and incrementing the initial packing/holding pressure to the optimum initial packing/holding pressure.

In another aspect the present invention provides a method for the automated setting-up of an injection molding machine, the machine for manufacturing injection molded parts and including an injection screw, including the steps of:

(1) defining a holding time equal to a predetermined default value;

(2) performing at least a partial injection cycle;

(3) measuring a pressure stroke being the change in displacement of the screw between packing time and the holding time;

(4) incrementing the holding time;

(5) repeating steps (3) and (4) until the pressure stroke stabilizes or a part so produced is acceptable;

(6) defining a linear relationship between screw displacement and time consistent with screw displacement at the packing time and at the holding time, between the packing time and the holding time;

(7) defining a gate freeze time as a time of maximum difference between the screw displacement and the linear relationship, thereby providing a value for the gate freeze time from measurements of the screw displacement.

The method may include the additional steps of:

(8) repeating steps (6) and (7), and defining an initial solidification time between the packing time and the gate freeze time;

(9) repeating steps (6) and (7), and defining an intermediate solidification time between the packing time and the initial solidification time; and

(10) determining an intermediate pressure from the ratio of the screw displacements at the intermediate time and at the gate freeze time, referenced to the packing time.

In one embodiment, the value of the holding time employed in step (6) is greater than that defined in step (1) by a factor of between 1 and 3.

In one embodiment, the predetermined default value is the greater of 2 times injection time and one second.

The stabilization may occur when the pressure stroke changes by less than a predetermined tolerance between successive measurements.

In one embodiment, the holding time is incremented in step (4) by between 5% and 50%, and more preferably by approximately 20%.

In one embodiment the predetermined tolerance is between 2% and 10%, and may be approximately 5%.

In the above aspects of the present invention, nozzle melt pressure, injection cylinder hydraulic pressure, forward propelling force applied to the screw, or any other measure proportional to or equal to the nozzle melt pressure may be used as a measure of, in place of, or to determine, injection pressure.

The injection cylinder hydraulic pressure may be used as a measure of or to determine the injection pressure.

BRIEF DESCRIPTION OF THE DRAWING

In order that the invention may be more clearly ascertained, preferred embodiments will now be described with reference to the accompanying drawings, in which.

DETAILED DESCRIPTION OF THE PREFERRED EMBODIMENTS

An Automated Molding Optimization (or AMO) method according to a preferred embodiment of the present invention is used in setting up the injection/filling velocity and packing/holding pressure profiles. Other injection molding machine parameters, including barrel temperatures, mold temperatures, cooling time and screw rotational velocity are presently the responsibility of the die setter.

The approach of AMO's velocity optimization is to profile regarding an inferred mold geometry, derived from the pressure differential. Pressure phase optimization is used to profile regarding an inferred polymer solidification, derived for a precise measurement of screw displacement. AMO determines machine and material characteristics in-line from the machine without the need for user interaction, resulting in optimized profiles that are 'in-phase' with the machine dynamics, material and mold geometry.

Figure 1:
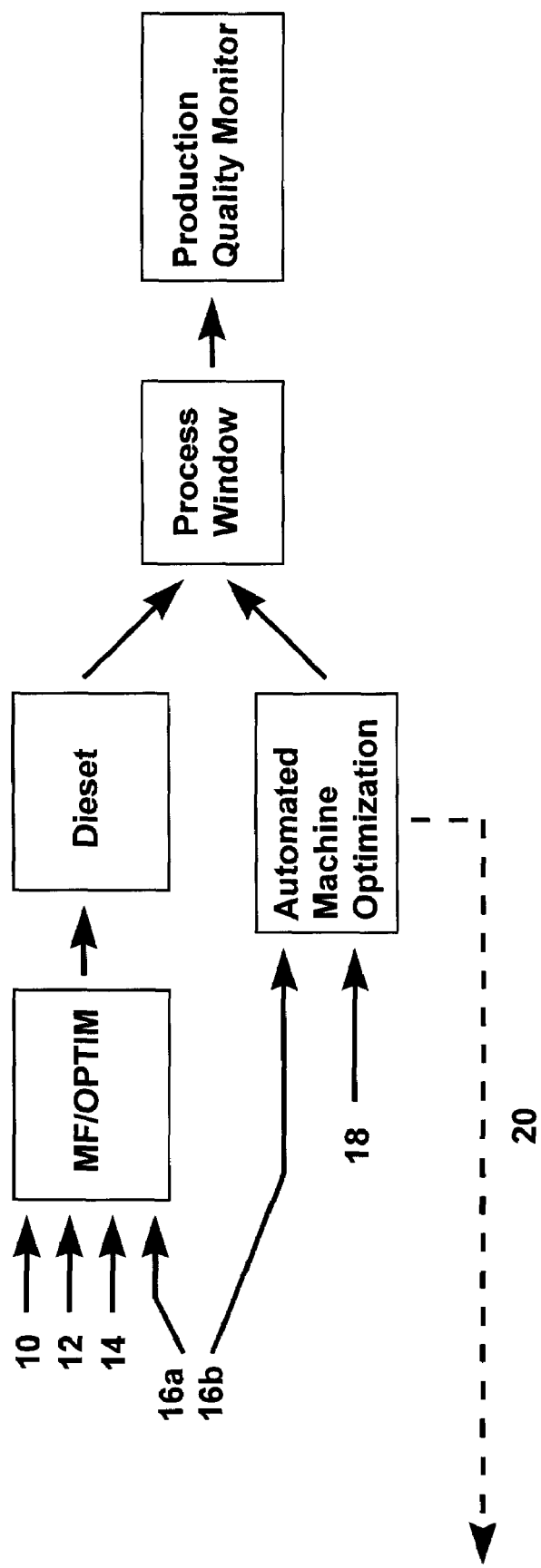
FIG. 1 is a schematic representation of the automated machine optimization method according to a preferred embodiment of the present invention.

FIG. 1 is a flow chart summarizing the role of the AMO method according to a preferred embodiment. In FIG. 1, the various inputs are Computer Aided Engineering (CAE) model 10, Machine Information 12, Material Information 14, Processing Conditions 16a and 16b, and Estimates of Velocity and Velocity Stroke 18. The inputs are employed in an optimization stage (MF/OPTIM or "Moldflow (TM) Optimization"). Feedback on the design of the part is indicated with a dashed line 20.

The preferred embodiment AMO method has six process optimization phases:

Velocity and velocity stroke, based on a single-step constant velocity;
Injection/Filling Velocity profiling;
Velocity defect elimination;
Packing pressure magnitude determination;
Gate freeze determination and pressure profiling;
Pressure phase defect elimination.

In general, if the screw gets too close to bottoming out, the screw charge profile is shifted back. This takes two shots, since the first may not plasticate to the new position. If the cycle time is too long AMO will ignore the cycle.

These six phases are summarized as follows:
1) Determination of velocity stroke and velocity settings: This phase assumes that a substantially uniform velocity profile is used, and that the tool can be adequately filled using such a profile. The rules used within this phase converge on settings that produce a 'good part', if a poor estimate of the velocity stroke or volume is input. A 'critical fill' velocity stroke is determined, to ensure that no packing occurs during the velocity controlled injection stage. The critical fill is the point at which the part is only just filled. Sometimes the polymer within the cavity is overfilled, but does not show any visible defects. The initial velocity profile is generated from: i) an estimate of the velocity stroke, entered directly or as a part volume, and ii) velocity, typically 50% of the machine's maximum capability. The charge stroke is initially set equal to approximately 1.1×velocity stroke. This phase requires user feedback after each part manufactured. At this stage, other velocity related and pressure phase related defects are ignored.
2) The first procedure in this phase is to determine an estimate of the relationship between injection velocity and the mean differential of the nozzle melt pressure profile. The nozzle melt pressure may be derived from hydraulic injection pressure multiplied by a screw intensification ratio. The injection velocity is perturbed about the velocity from phase 1, by predefined percentages, for example ±10%, ±20%. The next phase is to determine the nozzle pressure profile, for stable processing conditions, obtained using a uniform velocity profile, and then differentiate the profile. Machine response time is determined from the velocity profile. Using the pressure differential information during the velocity stage an optimized velocity profile is obtained. The profile is generated in two stages runner and cavity, and combined using a response check.
3) This phase involves velocity related defect elimination. The main objective is to vary the velocity profile to achieve a part with no velocity related defects. Velocity related defects are corrected. Defects include jetting, delamination, gloss marks, burn marks, weld lines, flash etc. Comment: The user simply selects the defect. In the case of conflicting defects, it is required to converge on a compromise point. One part (good quality immediately) is the minimum, the maximum depends on the user's assessment. Three parts is often typical.
4) This phase determines a critical packing pressure, i.e. a pressure level that will help to eliminate back flow of material, out of the cavity. The approach is to start low and increase the pressure until the desired level is reached.
5) This phase determines an inferred gate freeze, initial solidification and intermediate times. The times are determined by precisely monitoring the screw movement with a uniform pressure profile applied. Gate freeze time and initial solidification time is found, and the packing/holding profile is generated. This process does not require the weighing of any molded parts. We infer the cavity pressure from non-cavity sensors, specifically hydraulic pressure and screw movement.
6) This phase involves pressure related defect elimination. The main objective is to vary the pressure profile to achieve a part with no pressure related defects. Pressure related defects are assessed. These are flash, sink, warpage, and dimensional tolerance (too large/too small).

Phases 1 to 3 are initiated with zero or a very low packing pressure, typically only for 1 second.

These six phases are described in more detail as follows.

Phase 1:

This phase comprises the determination of velocity stroke and velocity settings. A constant velocity profile that results in a full part is found. All defects (apart from flash and short shot) are ignored.

The pressure profile is initially set to substantially zero.

Phase 1.1: User Estimation

The user is asked to provide an estimate of the part volume. The volume should be easily obtained from the die maker. The volume is divided by the area of the screw to give a velocity stroke; alternatively, the die setter can estimate the velocity stroke directly. An accurate estimate of part volume may also be obtained from a Computer Aided Engineering (CAE) model.

The estimated velocity stroke is compared with the maximum stroke of the machine to ensure the machine is a reasonable size for the part being made. The following checks are made:
charge stroke>maximum stroke
velocity stroke>90% maximum stroke
velocity stroke<5% maximum stroke The user also estimates the screw velocity. The velocity could be estimated by a 2D flow analysis, but at present this is seen as unwarranted, as the user would have to enter more information (e.g. material information, length of dominant flow path). Further, the user can be expected to have a reasonable idea of the correct velocity to use from their experience.

A flat filling profile is generated from these estimates; the VP point is configurable as a percentage of the estimated velocity stroke (default is 20%).

Phase 1.2: Optimization of Estimation

This phase aims to refine the user's estimate of the stroke so that a full (not flashed or short) part is made. Throughout the steps below configurable adjustment parameters are used. After each change to the set points a configurable number of parts are made to try to ensure steady state conditions.

Figure 2:
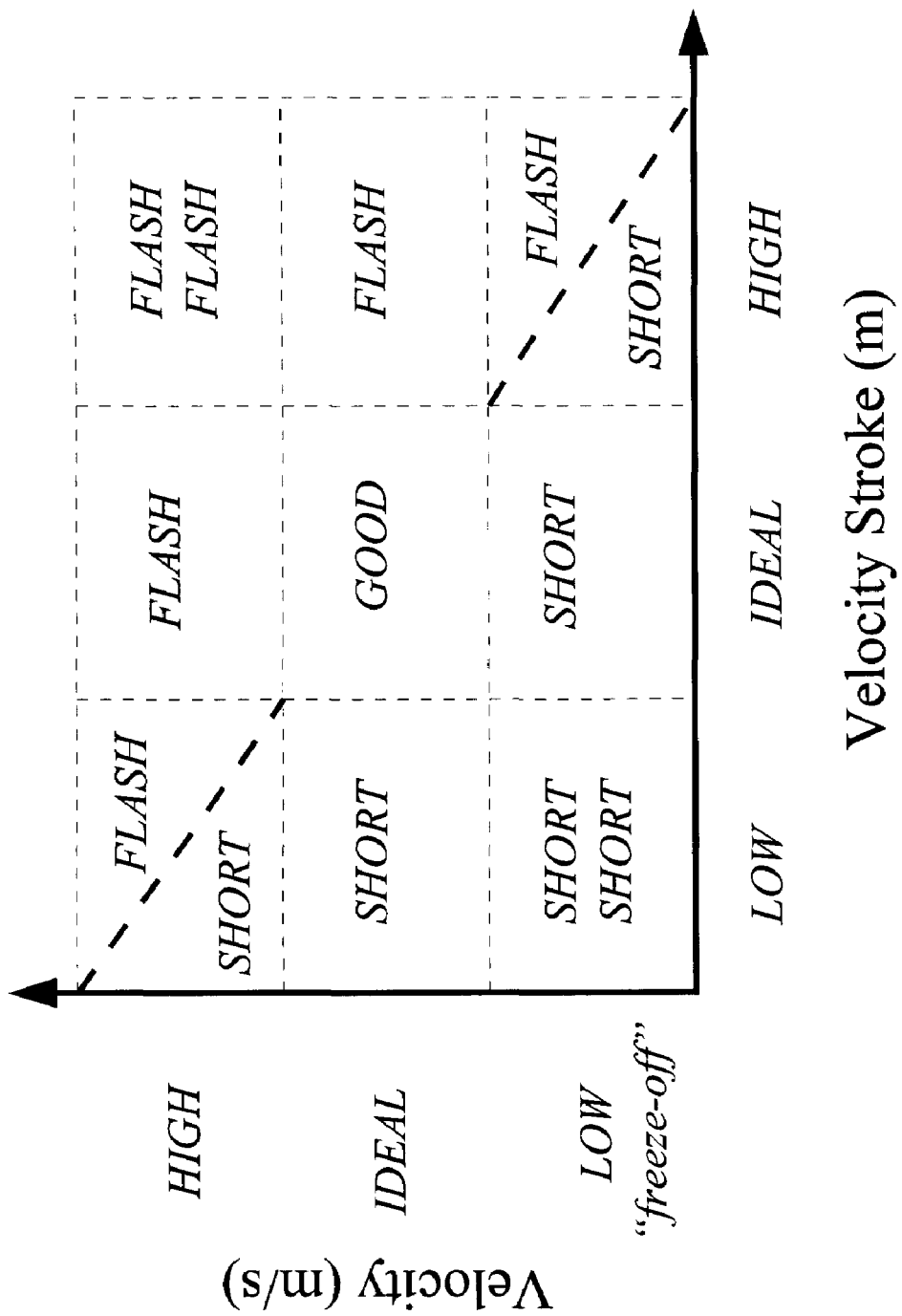
FIG. 2 is a graph illustrating schematically the influence of velocity and velocity stroke on the filling process.

The method of this phase was developed from the discovery of a relationship between injection velocity and velocity stroke, and the optimization of the material fill. This relationship is depicted schematically in FIG. 2.

The following steps summarize this phase:
1. A part is made, and feedback about the part quality is requested from the user.

2. If the part is short, the stroke is increased by moving the VP changeover point.
3. If the part is flashed, the stroke is decreased by moving the VP changeover point.
4. If the part is both short and flashed, the user is asked for more feedback: if the user thinks that there is melt freeze-off, the velocity is increased and the stroke reduced, otherwise the opposite occurs.
5. If the part is full, this phase is complete.
6. A part is made with the new set-points, but this time the user has the opportunity to specify that no improvement occurred. If the user specifies 'No Improvement', the following steps 7 to 9 are followed.
7. If the previous response was 'short', then velocity and stroke are increased. This allows for the short to have been caused by melt freeze off.
8. If the previous response was flash, then velocity and stroke are decreased
9. If the previous response was flash and short, the velocity is decreased and the stroke increased. The changes are made twice to make up for the previous (now known to be incorrect) modifications.
10. If the user does not specify 'No improvement', but instead repeats the previous quality assessment, then the previous set-point modifications are repeated.
11. If the user specifies short shot when previously specifying flash (or vice versa), the adjustment factor is halved to allow the set-points to converge. A configurable minimum adjustment factor is used to prevent adjustments becoming insignificant.
12. If velocity stroke increases cause the VP changeover point to be less than a configurable percentage of the velocity stroke, the charge stroke is increased before the next part is made.
13. When the charge stroke is increased, the next part is ignored, since the injection molding machine may have finished plasticating to the now incorrect position.
14. If no improvement is selected on three consecutive occasions, the procedure halts and the user asked to modify melt/mold temperatures.

Phase 1.3: Obtaining Critical Fill

After phase 1.2 is complete, a full part exists. However, the part may be overfilled, which is often the cause of internal stresses. It will also require an overly high packing/holding pressure to eliminate kickback. This phase attempts to eliminate this problem by obtaining a state of 'critical fill'.

Firstly, the stroke is reduced, as though the user had indicated flash. This is repeated each time the user indicates a full part. Eventually, a point is reached where the stroke is small enough to cause a short shot to occur. When the user indicates short shot, the stroke is increased (it should be noted that the change in stroke is smaller than previously due to convergence). When the part regains 'fullness', critical fill has been achieved.

Phase 2: Injection/Filling Velocity Profiling

This stage puts 'steps' into the velocity profile. These steps help maintain a constant flow front velocity, which in turn minimizes internal stresses in the molded part. Weightings are imposed on the raw velocity profile found to ensure it slows at the end of fill, which is known to improve burn marks, and at the runner (to prevent jetting).

This phase is employed after phase 1, and if the velocity profile is of constant velocity and pressure (nozzle or hydraulic) and displacement transducer data are filtered and available.

It is assumed that the displacement at which inflection points in the pressure curve are located does not change significantly when the velocity is altered.

Prior to calculating the velocity profile, the pressure information from a number of parts is stored and then averaged, in an attempt to smooth out deviations between cycles. A number of parts may also be ignored before this averaging takes place to achieve steady state conditions; both the number of parts to average and the number to ignore are configurable, with defaults of 1 and 0 respectively.

Phase 2.1: Determination of Material Properties

If AMO is to profile the velocity control, then it is necessary to know how large to make the steps. Thus, it is necessary to determine the relationship between the velocity set-point and the magnitude of $$\frac{dp}{dt}.$$

For example, if $$\frac{dp}{dt}$$

must be increased by 10%, this relationship is required in order to determine how high the velocity step should be.

The following steps are taken to determine the relationship between velocity and:

$$\frac{dp}{dt}:$$

1. The percentage velocity deviations are read from the configuration file;
2. The velocity is altered, a part is made, and the mean magnitude of the $$\frac{dp}{dt}$$

response (during velocity control) is recorded;
3. If more experiments are required, the velocity is altered according to the next percentage in the configuration file, and step 2 is repeated. If not, the velocity is reset to the user's estimate, and step 2 is repeated one last time.
4. Linear regression is used to find an equation relating the mean $$\frac{dp}{dt}$$

values recorded to the velocity set-points used.

Phase 2.2: Determination of Displacement Induction Time

Recorded data before the induction time should be ignored, since essentially nothing is happening, so it is necessary to determine the displacement induction time, which is a measure of the time required for the screw to commence movement after the data acquisition system receives an injection start signal.

The displacement induction time is found when the displacement data indicates the screw has moved beyond a small threshold distance. The threshold is calculated as a percentage of the charge stroke (e.g. 0.1%); this threshold should be typical of the noise level of displacement transducers.

Phase 2.3: Determination of Pressure Induction Time

Similarly, the pressure induction time is a measure of how long it takes pressure to begin increasing after the data acquisition system receives an injection start signal. This may be longer than the displacement induction time if decompression is used at the end of plasticisation.

The pressure induction time is found when the pressure data indicates the screw has increased above a certain small threshold above the initial pressure (this allows for transducer zero error). The threshold is calculated as the minimum of a percentage (e.g. 0.1%) of the maximum machine pressure and an absolute pressure value (e.g. 0.1 MPa). This threshold approximates the noise level on pressure transducers.

Phase 2.4: Determination of Machine Response Time

The injection molding machine cannot follow steps in the velocity profile if the steps are too short. This minimum time is defined in terms of the machine response time. Hence, it is necessary to determine the machine response time, which is a measure of the time required by the screw to obtain a given velocity.

The response time is simply the time at which the velocity data exceeds 85% of the target velocity.

Phase 2.5: Determination of Pressure Derivative (wrt Time)

As discussed above, it is desirable to keep the flow front velocity reasonably constant by introducing steps into the velocity profile. The size and location of these steps is based upon the $$\frac{dp}{dt}$$

calculations. The quantity $$\frac{dp}{dt}$$

provides an indication of the part geometry as seen by the advancing flow front. When $$\frac{dp}{dt}$$

increases, the flow front is faced with a narrowing in the cross-sectional area of the cavity.

A 33 point Savitsky-Golay smoothing filter is used to smooth the pressure information. The square root of all pressure information is taken. This allows for large $$\frac{dp}{dt}$$

values increasing at much faster rate when velocity is increased than average $$\frac{dp}{dt}$$

values. It should be noted that in Phase 1 there is calculated a linear relationship between mean $$\frac{dp}{dt}$$

and the velocity set-point. The quantity $$\frac{dp}{dt}$$

is calculated by subtracting the next pressure value by the current pressure value, and dividing by the sampling period.

Phase 2.6: Determination of Gate Time

Knowledge of when the flow front reaches the gate allows the method to have separate velocity profile steps for the runner system. The 'gate time' is thus the time at which the flow front reaches the gate.

The gate time is taken as the maximum of the three calculations detailed below. The maximum is used to attempt to ensure that a point away from the initial $$\frac{dp}{dt}$$

'hump' is found.

1)

$$\frac{dp}{dt}$$

'zero time': Between the induction time and 50% of the injection time, $$\frac{dp}{dt}$$

is checked to see when it falls below zero. The gate time is the point at which it rises back above zero;

2)

$$\frac{dp}{dt}$$

'low time': the maximum $$\frac{dp}{dt}$$

between the induction time and 50% of the fill time is found. The mean $$\frac{dp}{dt}$$

between the time at which this maximum occurs and the end of the fill time is found. Where $$\frac{dp}{dt}$$

first falls below this mean is the gate time. Note that the low time is always less than the zero time, so this calculation is only made if $$\frac{dp}{dt}$$

never falls below zero; and

3) Velocity stabilization time: Between 70% of the fill time back to the induction time, a moving average (over a three-point window) of the velocity data is calculated. The gate time falls where the moving average is outside ($\mu_{vel} \pm 12\sigma_{vel}$), where $\mu_{vel}$ and $\sigma_{vel}$ are calculated during an assumed steady state portion of the velocity data (e.g. between 70% and 90% of filling time). In other words, the method looks for the point at which the velocity first becomes stable, with an upper limit of 70% of the filling time imposed.

Phase 2.7: Determination of Stepped dp/dt Profile

As discussed above, it is desirable to keep the flow front velocity reasonably constant by introducing steps into the velocity profile. The steps in the velocity profile should correspond to the cross-sectional area of the cavity, which in turn should have a strong relationship with the stepped $$\frac{dp}{dt}$$

profile. The stepped $$\frac{dp}{dt}$$

profile approximates the $$\frac{dp}{dt}$$

calculations (after the gate time) as a series of steps. The number of steps is limited by a configurable limit, and the size of the steps need not depend on the machine response time. The maximum of $$\frac{dp}{dt}$$

between the gate time and the end of filling is found. A configurable percentage (e.g. 10%) of the maximum $$\frac{dp}{dt}$$

value $\Delta$ is calculated. Step number n is initialized to 0, and data count indices i and k to the induction time and zero, respectively. Index i is used to store the start position of each step in the $$\frac{dp}{dt}$$

data, and k is used to iterate through the data within each step. An initial $$\frac{dp}{dt}$$

value sum is stored for time=i+k.

$$\text{If } \left| \text{sum}/k - \frac{dp}{dt}[i+k+1] \right| > \Delta,$$

then the profile step n is set equal to sum/k, n is incremented, i set to i+k, and the method returns to phase 2.4. Otherwise, sum is increased by $$\frac{dp}{dt}[i+k+1],$$

k is incremented, and the method returns to the start of this phase (2.7) unless k =fill time. The method reaches this stage when k =fill time. The final profile step=sum / k, and any negative profile steps are set to zero.

Phase 2.8: Determination of Stepped Velocity Profile

Stepped velocity profiles can be entered into machine controllers as set-points, and should try to maintain a constant flow front velocity as the polymer moves into the cavity. The velocity profile determined in this section is based on the stepped $\frac{dp}{dt}$ profile determined by the previous phase, and does not take into account machine response time.

From the stepped dp/dt pressure profile, the following parameters are calculated:
1. Mean $$\frac{dp}{dt}$$

2. Maximum $$\frac{dp}{dt}$$

3. Minimum $$\frac{dp}{dt}$$

4. For each step n in the $$\frac{dp}{dt}$$

profile, the corresponding velocity step, where:

$$\text{velocity}_n = \left(\text{mean}\frac{dp}{dt} - \frac{dp}{dt}n\right) \bigg/ \left(\max\frac{dp}{dt} - \min\frac{dp}{dt}\right)$$

This gives the velocity profile scaled about 1, where 1 is the mean velocity (the user's estimate).

Phase 2.9: Determination of Runner Velocity

The runner velocity is the first step in the velocity profile. The runner velocity is chosen using the ratio of the maximum $$\frac{dp}{dt}$$

between the induction time and the gate time, and the mean pressure of the stepped pressure profile (see Phase 2.7: Determination of Stepped dp/dt Profile). As the ratio increases, the runner velocity decreases; the ratio is limited so that the runner velocity is never less than the mean velocity after the gate.

$$\text{Runner velocity} = 1 - 0.1 \times \left(\max\frac{dp}{dt} \bigg/ \text{mean of stepped pressure profile}\right)$$

Phase 2.10 Determination of End of Fill Velocity

A standard die setters' heuristic is to slow the velocity toward the end of fill. This helps prevent air becoming trapped within the cavity, and therefore helps prevent burn marks. It also helps ensure the part is not overfilled, and allows for a smoother transition into the packing/holding phase. The end of fill velocity is the last step in the velocity profile. The default is the last 10% of fill, though this is configurable.

A ratio of $$\frac{dp}{dt}$$

during the end of fill segment compared with $$\frac{dp}{dt}$$

in the 10% of fill immediately prior is calculated. If this ratio is high, the velocity at end of fill will be low, but limited to 50% of the prior velocity. If the ratio is low (i.e.

$$\frac{dp}{dt}$$

decreases at end of fill) the last velocity step is limited to the immediately preceding velocity, i.e. the velocity is not increased at end of fill.

Phase 2.11 Compensating for Response Time

The stepped velocity profile determined in the previous phase assumes the machine has infinitely fast response to changes in the set point. Of course, this is not realistic, and so steps should be lengthened to take the actual response time into account. Steps close together in magnitude are merged since the difference is likely to be overwhelmed by the error in the controller. If such small differences were left in the velocity profile the algorithm would lose credibility. A maximum number of steps are specified since nearly all IMM controllers on the market today are limited in this way.

This phase lengthens the step size of the velocity profile calculated in the previous phase if they are less than the response time calculated in Phase 2.4: Determination of Machine Response Time. Furthermore, steps that are closer together in magnitude than the desired threshold are merged. If at the end of this process there are more steps than allowed, this process is repeated with a larger response time and a larger threshold.

Each step in the velocity profile is merged with the next step, if the length of the step is less than the response time. The steps are merged until the merged step length is greater than or equal to the response time. The resulting step has a velocity corresponding to the weighted velocity of the two steps. For example:

newVelocity=(time 1×velocity 1+time 2×velocity 2)/(time 1+time 2)

This process is repeated until all steps have been checked for response time.

If the duration of the last step is too short, it is merged with the second last step. The profile is rescaled to the previous maximum and minimum. This resealing may be limited by a configuration file parameter so that small steps are not blown out of proportion. The resealing also maintains 1 (the user's estimate) as the mean value. The magnitude of each velocity step is compared against the magnitude of the next step. If the difference is less than 10% of the maximum velocity, the steps are merged as described above, and the profile resealing is returned to. The number of steps in the profile is checked. If it is greater than the maximum number allowed, this stage is repeated with a response time 20% longer, and a velocity difference threshold of 20% instead of 10%.

Phase 2.12 Converting Time to Displacement, and Velocity to Physical Units

Most injection molding machine controllers accept velocity profiles in terms of screw displacement (rather than time). Also, the velocity values are currently normalized, and need to be scaled to physical units (e.g. mm/s) before they can be passed to an IMM controller.

A conversion factor, $\alpha$, is calculated using the relationship found in Phase 1. For each velocity step n:

$$\text{velocity}_n = \text{user velocity estimate} \times ((\text{velocity}_n - 1) \times \alpha + 1)$$

The result is in S.I. units (m/s).

To convert times to displacements, a conversion factor-between the set-point velocity stroke and the number of samples during filling-is calculated. The conversion factor does not have to take into account velocity magnitudes earlier in the profile being different to those used when the part was made, since the velocity step changes should be relative to the flow front position, not the time at which they occurred.

Set the displacement of each step from the charge stroke using the conversion factor:

$$\text{displacements}_N = \text{charge stroke} - \text{conversion factor} \times \text{step sample number}_n$$

Phase 3: Velocity Defect Elimination

At this point, the magnitude of the velocity steps is an arbitrary percentage of the maximum velocity of the machine (although they should be approximately correct relative to each other). As a result, molding defects could occur. This stage attempts to rectify the defects related to the velocity profile by executing heuristics in response to user feedback.

There are two prerequisites: firstly that one part has been made with the velocity profile from phase 2, and secondly that user feedback has been supplied regarding the quality of the part produced. The feedback is one of the following defects: no defect, flash, short shot, weld, burn, jetting, streak, gloss, delamination, and record grooves. It is assumed that changing the average magnitude of the velocity set-point does not effect the position of inflection points in the pressure curve.

The following responses are made to each defect, in making another molding to ensure good quality.
1. Flash: Decrease all velocity steps by a multiplier.
2. Short: Increase all velocity steps by multiplier
3. Weld: Same as short.
4. Burn: The user is asked for more information; is the burn mark near the gate, all over, or near the end of fill. If the burn is all over, decrease all velocity steps. If the burn is near the end of fill, reduce the velocity of the screw at all points in the last 25% of the filling profile. Burn marks near the gate are treated in a similar fashion, except the first 25% of velocity points are altered.
5. Jetting: decrease all velocity points in the first 25% of the velocity profile.
6. Streak marks: as for burn marks, except the user gets a choice of 'all over' or 'end of fill'.
7. Gloss marks: increase the entire velocity profile by a multiplier.
8. Delamination: decrease the entire velocity profile by a multiplier
9. Record Grooves: As for gloss marks.

The rule base fails if the desired action cannot be taken; in this event the user is informed of the situation and given advice on how to solve it (via on-line help).

Phase 4: Obtaining the Correct Packing Pressure

At this point, the injection molding machine is using a default low pressure. The correct level of pressure to use during the pressure control stage that avoids kickback is desired. This stage does this, but does not profile the pressure control set-points, or find the time that pressure control should be maintained.

There are three prerequisites: firstly that Phase 3 has completed successfully, secondly that the maximum packing pressure is known, and thirdly that steady state conditions prevail.

Phase 4.1: Initial Pressure Control Set-points & Velocity Stroke Reduction

The pressure control time is set to twice the injection time (or 1 s, whichever is greater), the pressure level is 5% of the end of fill pressure, and a 'rectangular' shape pressure profile is used.

Further, to ensure the melt is not compressed during filling, the velocity stroke is reduced by 2%, in line with current molding practice.

Phase 4.2: Determination of Kickback

Kickback is defined as the distance travelled by the screw in the reverse direction to injection during pressure control after the packing time. This is caused by the pressure control set-point being less than the back pressure exerted by the melt in front of the screw.

It is desirable to eliminate kickback to avoid polymer flowing out of the cavity, which is known to be a cause of sink marks, warpage and other dimensional problems.

The maximum kickback displacement is found by finding the packing time. The kickback is then the distance from the minimum displacement before the packing time to the displacement at the packing time. If the kickback is not negative, it is set to zero.

The first task is to determine the packing time by examining the nozzle melt pressure (or the hydraulic pressure). The equation of a straight line from the pressure at the v/p switchover point time to the pressure at the hold time is calculated, and then the time at the maximum difference between the straight line and the recorded pressure curve is the packing time.

However, a pressure increase after v/p switchover indicates that no kickback has occurred. In this case, the packing time is the v/p switchover point. This does not mean that the packing time is always at the v/p switchover point when no kickback occurs.

Phase 4.3: Kickback Elimination

This procedure is employed where kickback is greater than zero. If there is no kickback, the pressure level is acceptable.

The initial packing/holding pressure is increased by 5% of the end of velocity control phase pressure (or 'end of fill pressure'). Phase 4.2 is then repeated until the difference between kickback for the current shot and last shot is less than a configurable percentage, or until the maximum machine pressure is reached.

This procedure should not fail, as kickback will only occur if the fill pressure is significantly greater than the packing/holding pressure. Therefore, a suitable packing/holding pressure should be obtainable on this machine.

Phase 5: Estimating Holding Time

The gate pressure control time is determined by means of an end point fit between the 'pack' time and the 'search time' using data recorded up to the 'hold time'.

Phase 5.1 Determination of Gate Freeze Time and Holding Time

To this point, the holding time has been taken to be twice the injection time. This is an arbitrary value, and in most cases is too short. The aim of this stage, therefore, is to find a more accurate holding time, as short holding times can result in molding defects, such as sink marks, since the polymer will be able to flow back out of the cavity before solidification occurs. Further, although phase 5 estimates the gate freeze time, the procedure relies on the current holding time being longer than the gate freeze time. An arbitrarily long holding time can not be used since there is a slight risk of tool damage.

The holding time is increased by 50% of its current value each shot, until the forward movement of the screw between the packing time and holding time converges. Convergence is defined as a change of less than 5% in movement from one shot to the next. The current time is chosen (rather than the old time) to allow the gate freeze estimation to be more accurate. Sometimes the screw movement will not converge for a reasonable holding time, since there may be slippage on the check ring valve or the polymer behind the gate (e.g. in the runner system) may continue to compress after the gate has frozen. To prevent the holding time increasing without limit, a maximum of 30 s is used.

Phase 5.2: Pressure Profiling

Figure 3:
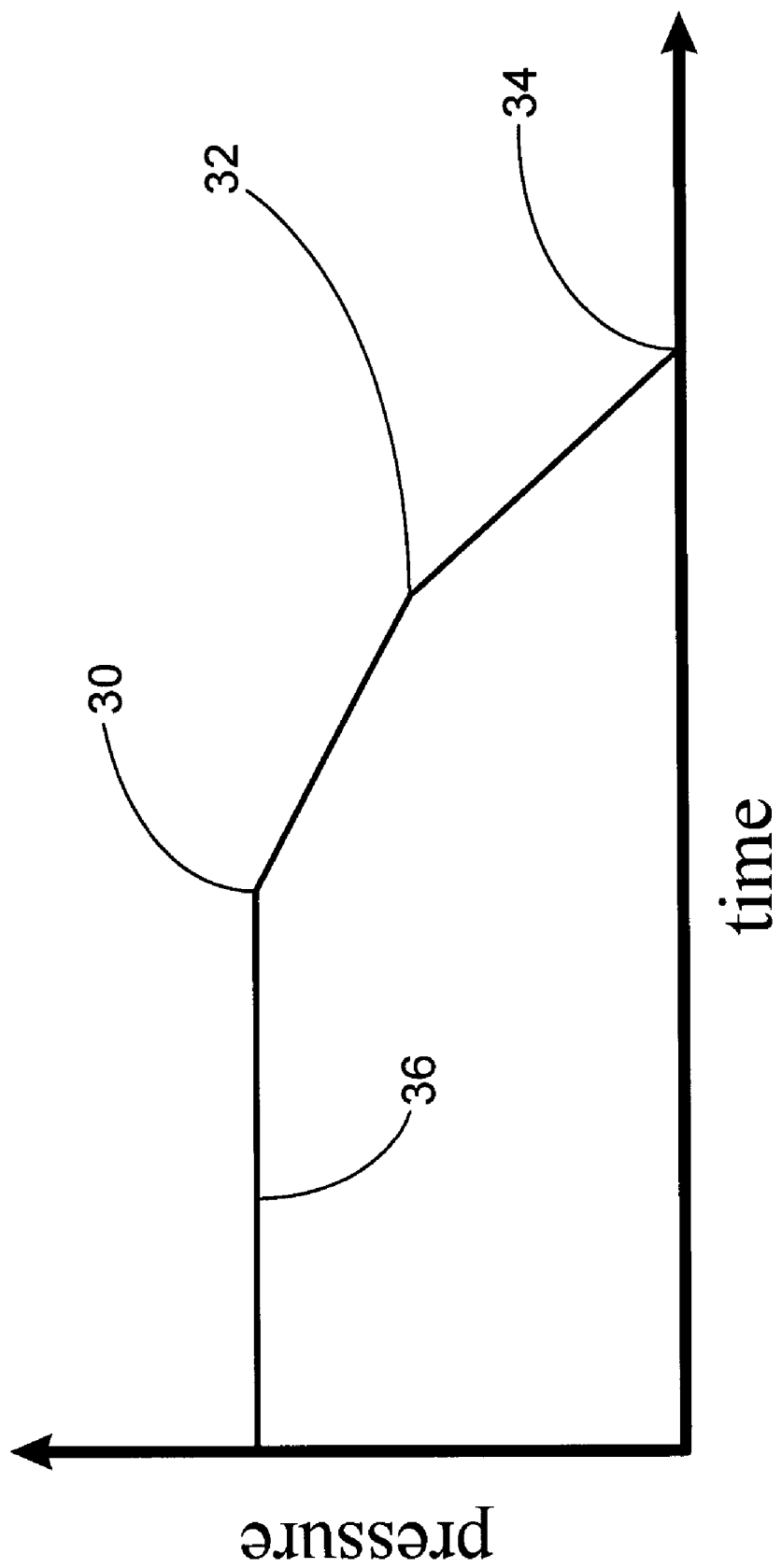
FIG. 3 depicts a typical pressure profile resulting from a pressure profiling method according to a preferred embodiment of the present invention.

Pressure profiling is designed to find the initial solidification time ts and gate freeze time tf, and an intermediate time, ti, between these two. Further, the desired pressure Pi at ti is calculated, while the pressure at tf is set to zero, since any pressure applied after gate freeze time will have no effect on part quality after this time. FIG. 3 shows the form of the resulting profile, where the point corresponding to ts is indicated at 30, Pi and ti at 32, tf at 34 and the pressure level determined in the previous stage at 36.

Two prerequisites are that the pressure level and the holding time have been determined.

Profiling the pressure control set-points helps prevent over packing of the part as the polymer in the cavity cools, since the pressure will be applied to a smaller molten area as cooling progresses. The internal stress of the part may also be improved, since a more similar force will be applied to each fraction of the cooling mass. The point at time ti helps to more accurately estimate the cooling rate, since it is unlikely to be linear. The gate freeze time tf is determined using end point fits on the pressure and displacement data. An additional end point fit between the packing time and tf over the displacement data gives ts, and a final end point fit (again using displacement information) between ts and tf gives ti. Pi is determined from the following calculation:

$$Pi = Porig\left(\frac{Dpacktime - Dintermediatetime}{Dpacktime - Dfreezetime}\right)$$

where Dpacktime is the screw displacement at the packing time,

Dintermediatetime is the screw displacement at ti,

Dfreezetime is the screw displacement at tf, and

Porig is the pressure found in Phase 4.

If the gate freeze time cannot be found, the original pressure control time is used instead.

Once the packing time is established, the displacement curve is analyzed to determine the gate freeze time. The search time is greater than or equal to the holding time. It is determined by drawing a constant displacement line from the end of recorded data up to 3× (hold time−packing time) +hold time, and also drawing a line extrapolated from the displacement curve between the 75% to 95% time locations ($m_d$).

The gradient of the resulting end point fit line ($m_E$) is then compared to $m_d$, and the search time is decreased until $m_E > k \times m_d$, where $1.3 \leq k \leq 3.5$ and preferably k=2.

This technique allows a more accurate estimation of the gate freeze time without the actual holding time increasing.

Pack displacement is the distance moved by the ram after the packing time, and the gate freeze time is the maximum difference between the end fit line and the recorded displacement curve.

Phase 6: Removing Packing/Holding Related Defects

After Phase 5 is finished, there is still some possibility of quality defects remaining. However, the defects present should not be related to the velocity control (filling) phase, since these were eliminated in Phase 3. The defects that are related to the pressure control set-points are:

Flash

Warpage

Sink

Dimensional Tolerance

A simple rule base is used to eliminate the defects listed in the introduction. The rule base does not alter the shape of the profile-it is simply 'stretched and squeezed'. This rule base is:

Flash: Decrease the magnitude of the profile by 10%.

Warpage: Decrease the magnitude of the profile by 5%.

Sink: Increase the magnitude of the profile by 5%. Also increase the pressure control time by 5%.

Dimensional Tolerance: If the part is too large, decrease the magnitude of the profile by 5%. If the part is too small, increase the magnitude by 5%.

In conclusion, AMO allows process optimization to be performed quickly by molders. The process optimization is 'in-phase' with the actual process, i.e. it compensates for specific machine dependent parameters, such as leakage from the check-ring, poor velocity control, utilizing the actual processing conditions.

Thus, AMO provides consistent machine set-up allowing operators with little diesetting experience to optimize machine set-up; reduces the requirement for skilled labour, i.e. de-skills the set-up procedure; provides process optimization throughout molding facilities; provides better integration of mold design and part production, to bring the benefits of simulation upstream into the world of the product designer and to link simulation downstream into the production environment; and provides easier installation on modern velocity controlled injection molding machines. Machine process information is obtained from standard machine transducers.

AMO optimizes velocity and pressure phase profiles. Velocity profiling assists in eliminating flashing, short shots, splay mark/gate blush/molecular stripping, streak marks/flow lines, delamination/flaking, gloss/gloss bands, burning, jetting, sink marks and warpage. Velocity profiling also optimizes process repeatability, injection time and clamp force.

Pressure profiling assists in eliminating flashing, warpage, variation, sink marks and demolding. Pressure profiling optimizes critical dimensions and back flow of polymer.

Thus, AMO allows machine operators with little previous diesetting experience to set-up the injection molding machine in approximately 25 to 40 cycles. AMO may eliminate most molding problems without the need for an experienced die setter. It automates the machine set-up procedure by determining optimum processing conditions by the intelligent interpretation of in-line process measurements.

Modifications may be made to the invention as will be apparent to a person skilled in the art of injection molding and injection molding machine set-up methods. These and other modifications may be made without departing from the ambit of the current invention, the nature which may be ascertained from the foregoing description and the drawings.

I claim:

1. A method for the automated setting-up of an injection molding machine, said machine for manufacturing injection molded parts and including an injection screw, comprising the steps of:
   (1) defining a holding time equal to a predetermined default value;
   (2) performing at least a partial injection cycle;
   (3) masuring a pressure stroke being the change in displacement of said screw between packing time and said holding time;
   (4) incrementing said holding time;
   (5) repeating steps (3) and (4) until said pressure stroke stabilizes or a part so produced is acceptable;
   (6) defining a linear relationship between screw displacement and time consistent with screw displacement at said packing time and at said holding time, between said packing time and said holding time;
   (7) defining a gate freeze time as a time of maximum difference between said screw displacement and said linear relationship, thereby providing a value for said gate freeze time from measurements of said screw displacement.

2. A method as claimed in claim 1, further comprising the steps of:
   (8) repeating steps (6) and (7), and defining an initial solidification time between said packing time and said gate freeze time;
   (9) repeating steps (6) and (7), and defining an intermediated solidification time between said packing time and said initial solidification time; and
   (10) determining an intermedite pressure from the ratio of the screw displacements at said intermediate time and at said gate freeze time, referenced to said packing time.

3. A method as claimed in claim 1, wherein the value of (2) are repeated a plurality of times to obtain a plurality said holding time employed in step (6) is greater than that defined in step (1) by a factor of between 1 and 3.

4. A method as claimed in claim 1, wherein said predetermined default value is the greater of 2 times injection time and one second.

5. A method as claimed in claim 1, wherein said stabilization occurs when said pressure stroke changs by less than a predetermined tolerance between successive measurements.

6. A method as claimed in claim 1, wherein said holding time is incremented in step (4) by between 5% and 50%.

7. A method as claimed in claim 1, wherein said holding time is incremented in step (4) by approximately 20%.

8. A method as claimed in claim 1, wherein said predetermined tolerance is between 2% and 10%.

9. A method as claimed in claim 8, wherein said predetermined tolerance is approximately 5%.

10. A method as claimed in claim 2, wherein the value of said holding time employed in step (6) is greater than that defined in step (1) by a factor of between 1 and 3.

11. A method as claimed in claim 3, wherein said predetermined default value is the greater of 2 times injection time and one second.

12. A method as claimed in claim 4, wherein said stabilization occurs when said pressure stroke changes by less than a predetermined tolerance between successive measurements.

13. A method as claimed in claim 5, wherein said holding time is incremented in step (4) by between 5%. and 50%.

14. A method as claimed in claim 7, wherein said predetermined tolerance is between 2% and 10%.

* * * * *